US008277043B2

(12) United States Patent
Hattori et al.

(10) Patent No.: US 8,277,043 B2
(45) Date of Patent: Oct. 2, 2012

(54) HANDY PRINTER AND MOBILE PHONE PROVIDED WITH THE SAME

(75) Inventors: Shingo Hattori, Nagoya (JP); Narumi Kawai, Nagoya (JP); Yoshitsugu Morita, Nagoya (JP); Hiroto Sugahara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 65 days.

(21) Appl. No.: 12/413,291

(22) Filed: Mar. 27, 2009

(65) Prior Publication Data

US 2009/0244250 A1 Oct. 1, 2009

(30) Foreign Application Priority Data

Mar. 28, 2008 (JP) ................................ 2008-085833

(51) Int. Cl.
*B41J 29/13* (2006.01)
*B41J 2/01* (2006.01)
*G01D 15/16* (2006.01)

(52) U.S. Cl. ......................... 347/109; 347/101; 346/143

(58) Field of Classification Search .................. 347/101, 347/108, 109; 346/76, 143; 400/88; 358/1.12, 358/1.16

See application file for complete search history.

(56) References Cited

U.S. PATENT DOCUMENTS 5,028,934 A * 7/1991 Kasai et al. .................. 347/215
5,486,062 A * 1/1996 Tsurumaru .................. 400/618
6,741,871 B1 5/2004 Silverbrook et al.
7,241,005 B2 7/2007 Silverbrook
2007/0072593 A1* 3/2007 Huliyapur Math ........... 455/415
2007/0222847 A1* 9/2007 Silverbrook .................. 347/109

FOREIGN PATENT DOCUMENTS

JP S63-166441 U 10/1988
JP 2003-518857 A 6/2003
JP 2005-517553 A 6/2005
WO 0141480 A1 6/2001
WO 03069882 A1 8/2003

* cited by examiner

*Primary Examiner* — Charlie Peng
*Assistant Examiner* — Hung Lam
(74) *Attorney, Agent, or Firm* — Baker Botts L.L.P.

(57) ABSTRACT

A handy printer and a mobile phone based on the use of the same are provided, wherein the printing can be performed on recording paper sheets having various sizes. The handy printer comprises a cover member which is movable between an exposure position at which an ink discharge surface of an ink discharge head is exposable to the outside and a cover position at which the discharge surface is hidden from the outside. When the cover member is positioned at the cover position, the recording is permitted on a recording paper sheet accommodated in a recording paper-accommodating mechanism. When the cover member is positioned at the exposure position, the recording is permitted on a recording medium disposed outside a handy-printer body casing.

7 Claims, 13 Drawing Sheets

HANDY PRINTER AND MOBILE PHONE PROVIDED WITH THE SAME

CROSS REFERENCE TO RELATED APPLICATION

The present application claims priority from Japanese Patent Application No. 2008-085833, which was filed on Mar. 28, 2008, the disclosure of which is herein incorporated by reference in its entirety.

BACKGROUND OF THE INVENTION

1. Field of the Invention

The present invention relates to a handy printer capable of performing printing on a recording medium, and a mobile phone provided with the same.

2. Description of the Related Art

Fixed apparatuses are mainly popular and widespread in relation to the printer based on, for example, the ink-jet system for performing the printing on the recording medium. However, various handy printers, which are of the portable type and which are easily carried, have been also suggested. A portable printer is known as an example thereof, in which a printer is contained in a mobile phone.

Japanese Patent Application Laid-open No. 2003-518857 (PCT) describes such a mobile phone which contains a printer. The mobile phone which contains the printer comprises an earpiece or speaker port 2, a microphone 3, an antenna 4, a series of push-buttons 5, and preferably a color LCD screen 6 for displaying information. The mobile phone further comprises a printer unit 12 and a printing medium stock container 9. A card 9 or a sheet 10, which has a name card size, is fed from the printing medium stock container 9 to the printer unit 12 by means of a printing medium feeding means 17, and an image is printed thereon.

In the case of the mobile phone which contains the printer described in Japanese Patent Application Laid-open No. 2003-518857 (PCT), the printing is performed on the contained card 9 or the contained sheet 10. Therefore, the size of the recording medium is limited to those of the small-sized recording media such as the name card size. Therefore, it is impossible to perform the printing on any large-sized recording medium which cannot be accommodated in the main apparatus body. The printer-containing mobile phone is inferior in the versatility in relation to the size of the recording medium.

SUMMARY OF THE INVENTION

The present invention has been made in order to solve the problem as described above, an object of which is to provide a handy printer and a mobile phone provided with the same wherein the printing can be performed not only on a small-sized recording medium capable of being contained but also on a large-sized recording medium incapable of being contained, and the printing can be performed on recording media having various sizes.

The present invention resides in a handy printer which performs recording by discharging an ink to a recording paper and a recording medium (recording member), the handy printer comprising a recording paper-accommodating mechanism which accommodates the recording paper; an ink discharge head having an ink discharge surface in which nozzles discharging the ink to the recording paper are formed; a recording paper transport mechanism which transports the recording paper; a cover member which is movable between a cover position (hidden position) at which the cover member covers the ink discharge surface and an exposure position at which the cover member does not cover the ink discharge surface; and a handy-printer body (main body) which holds the cover member to be movable between the cover position and the exposure position, wherein a controller which controls the ink discharge head such that the ink discharge head performs the recording on the recording paper when the cover member is positioned at the cover position, and that the ink discharge head performs the recording on the recording medium (recording member) which is located at the outside of the handy printer when the cover member is positioned at the exposure position.

According to the present invention, the recording can be performed on recording media having various sizes without being limited to the recording paper sheet having a size capable of being accommodated in the recording paper-accommodating mechanism.

In the handy printer of the present invention, the cover member may have a rotary support point provided on the handy-printer body, and the cover member may be provided rotatably about the rotary support point; the recording paper transport mechanism may include a plurality of recording paper-contact rollers; the handy-printer body may have a concealable surface which is concealed by the cover member when the cover member is positioned at the cover position, the ink discharge head and the recording paper-contact rollers being provided on the concealable surface; the recording paper-accommodating mechanism may be provided so that the recording paper-accommodating mechanism is capable of holding a plurality of sheets of the recording paper in a stacked state, on a surface of the cover member facing the concealable surface when the cover member is positioned at the cover position; and the recording paper-contact rollers may protrude from the concealable surface than the ink discharge surface, and a part of the recording paper-contact rollers may be brought into contact with the plurality of sheets of the recording paper in the stacked state held by the recording paper-accommodating mechanism when the cover member is positioned at the cover position.

Accordingly, the recording paper-accommodating mechanism is provided on the side of the cover member not on the handy-printer body. Therefore, when the cover member is rotated and moved to the exposure position, the ink discharge surface of the ink discharge head can be exposed without being obstructed by the recording paper-accommodating mechanism. Therefore, the two recording modes can be easily selected and executed, including the recording on the recording paper sheet accommodated in the recording paper-accommodating mechanism and the recording on the recording medium disposed at the outside of the casing, by merely rotating the cover member.

The handy printer of the present invention may further comprise a communication mechanism which enables external communication; a call arrival-notifying mechanism (a call or signal arrival-notifying mechanism) which performs a arrival-notifying operation to notify a user of reception of call arrival in response to the reception of the call arrival received by the communication mechanism; a notification-disabling mechanism which disables the notifying operation performed by the call arrival-notifying mechanism so that notification is not performed by the call arrival-notifying mechanism even when the call arrival is received; a first position-detecting mechanism which detects whether or not the cover member is at the exposure position; and a recording operation-detecting mechanism which detects whether or not a recording operation is being performed by the ink discharge head; wherein the notification-disabling mechanism may disable the call arrival-notifying operation (a call or signal arrival-notifying operation) when the first position-detecting mechanism detects that the cover member is at the exposure position and the recording operation-detecting mechanism detects that the recording operation is being performed.

Accordingly, the handy printer of the present invention may have the communication mechanism. In the case of the handy printer of the present invention provided with the communication mechanism, when the cover member is at the exposure position and the recording operation is performed by the ink discharge head, i.e., when the recording is performed on the recording medium disposed outside the casing, then the call arrival-notifying operation is not performed for the user, even when any incoming telephone call, any text message, or any signal arrives to be received by the communication mechanism. When the recording is performed on the recording medium disposed outside the casing, it is necessary for the user to perform the positioning of the device or apparatus with respect to the recording medium in order to maintain the relative position between the recording medium and the liquid droplet discharge head contained in the device or apparatus. If the user moves the handy printer of the present invention so that the handy printer is separated from the recording medium in response to the call arrival-notifying operation, then the recording is not only interrupted, but the ink, which is discharged from the ink discharge head, is also landed on any inappropriate position to cause a fear that the image to be recorded may be disturbed. According to the present invention, even when any incoming telephone call, any text message, or any signal arrives to be received, the user is not notified of the arrival or the reception. Therefore, the inconvenience as described above can be avoided, and the recording can be reliably executed on the recording medium disposed outside the casing.

According to the handy printer of the present invention, it is possible to perform the recording on recording media having various sizes without being limited to the recording paper sheet having the size capable of being accommodated in the recording paper-accommodating mechanism.

DESCRIPTION OF THE PREFERRED EMBODIMENTS

An embodiment of the present invention will be explained below. This embodiment illustrates an example of a handy printer having a communication mechanism, wherein the present invention is applied to a mobile phone by way of example.

Figure 1:
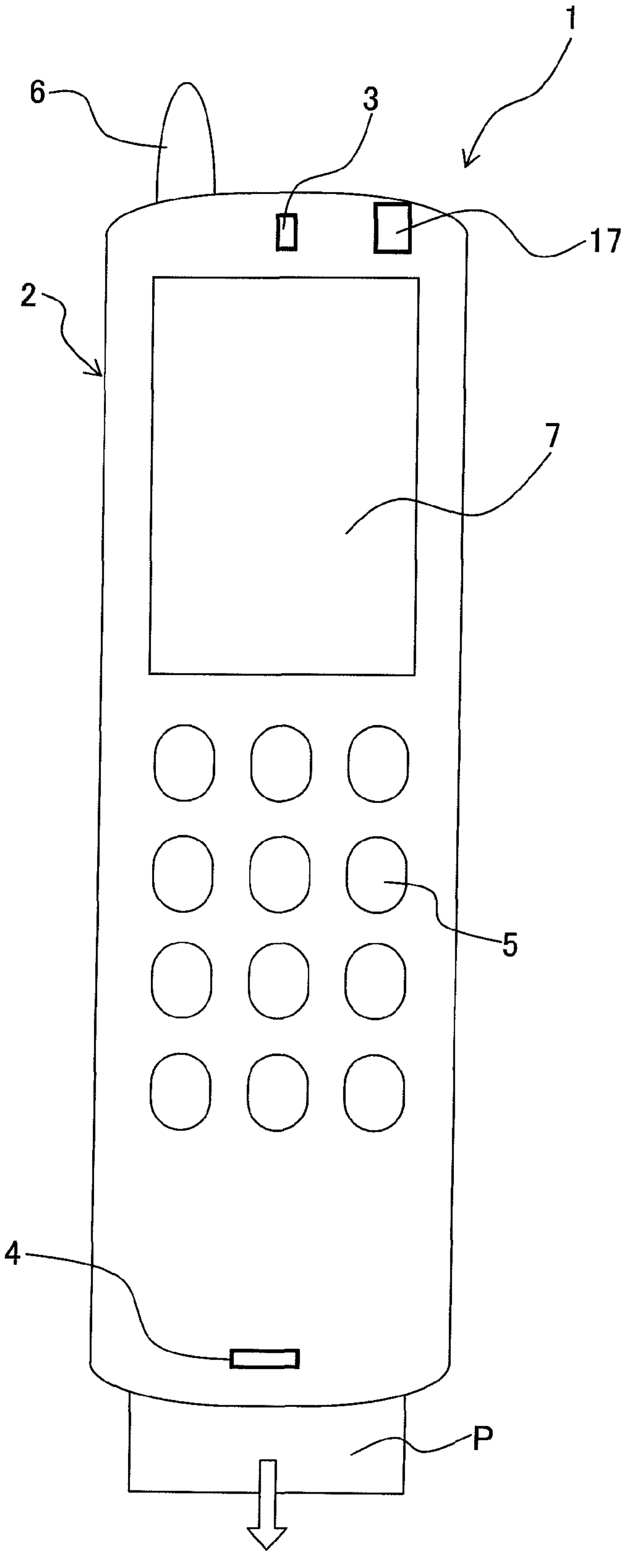
FIG. 1 shows a schematic top view illustrating a handy printer 1 according to an embodiment of the present invention.

FIG. 1 shows a schematic top view illustrating the handy printer 1 (mobile phone) of this embodiment. As shown in FIG. 1, the handy printer 1 comprises a handy-printer body (main body) casing 2, an earpiece or speaker port 3 which is open on one end side of the handy-printer body casing 2, a microphone port 4 which is open on the other side opposite to the speaker port 3, and push-buttons 5 which are provided for a user to select a series of telephone functions such as the telephone conversation.

The handy printer 1 further comprises an antenna 6 which is arranged on the handy-printer body casing 2, and a display screen 7 which displays images and/or letter or text information. The handy-printer body casing 2 is composed of a material including, for example, a resin, a metal such as stainless steel, and an alloy. The speaker port 3 is open at a position corresponding to a receiving speaker arranged in the handy-printer body casing 2. The speaker port 3 is constructed so that the voice from a person on telephone is emitted during the telephone conversation. The microphone port 4 is open at a position corresponding to a microphone arranged in the handy-printer body casing 2. The microphone port 4 is capable of collecting the voice of the user during the telephone conversation. Information of, for example, numerals and letters is indicated on the surfaces of the push-buttons 5. The push-button 5 is composed of a material including, for example, a resin, a soft member such as rubber, and stainless steel. The user can push the push-buttons 5 to make the desired instruction to a control unit (controller) 40 of the handy printer (see FIG. 13). A part of the antenna 6 is accommodated in the handy-printer body casing 2. The antenna 6 can be elongated from the handy-printer body casing 2 depending on the situation of the receiving sensitivity of the radio wave. The antenna 6 is not limited to only the example shown in the drawing in which the antenna 6 is arranged on the outer side of the handy-printer body casing 2. The antenna 6 may be contained in the handy-printer body casing 2. The display screen 7 is composed of, for example, a liquid crystal display. The display screen 7 displays information about, for example, the telephone number of a person on telephone when a telephone call arrives in some cases. In the case of the mobile phone provided with the mail function, the display screen 7 sometimes displays text information of a mail. The display screen 7 also displays information about the functions in conformity with the various functions applied to the handy printer 1.

Figure 2:
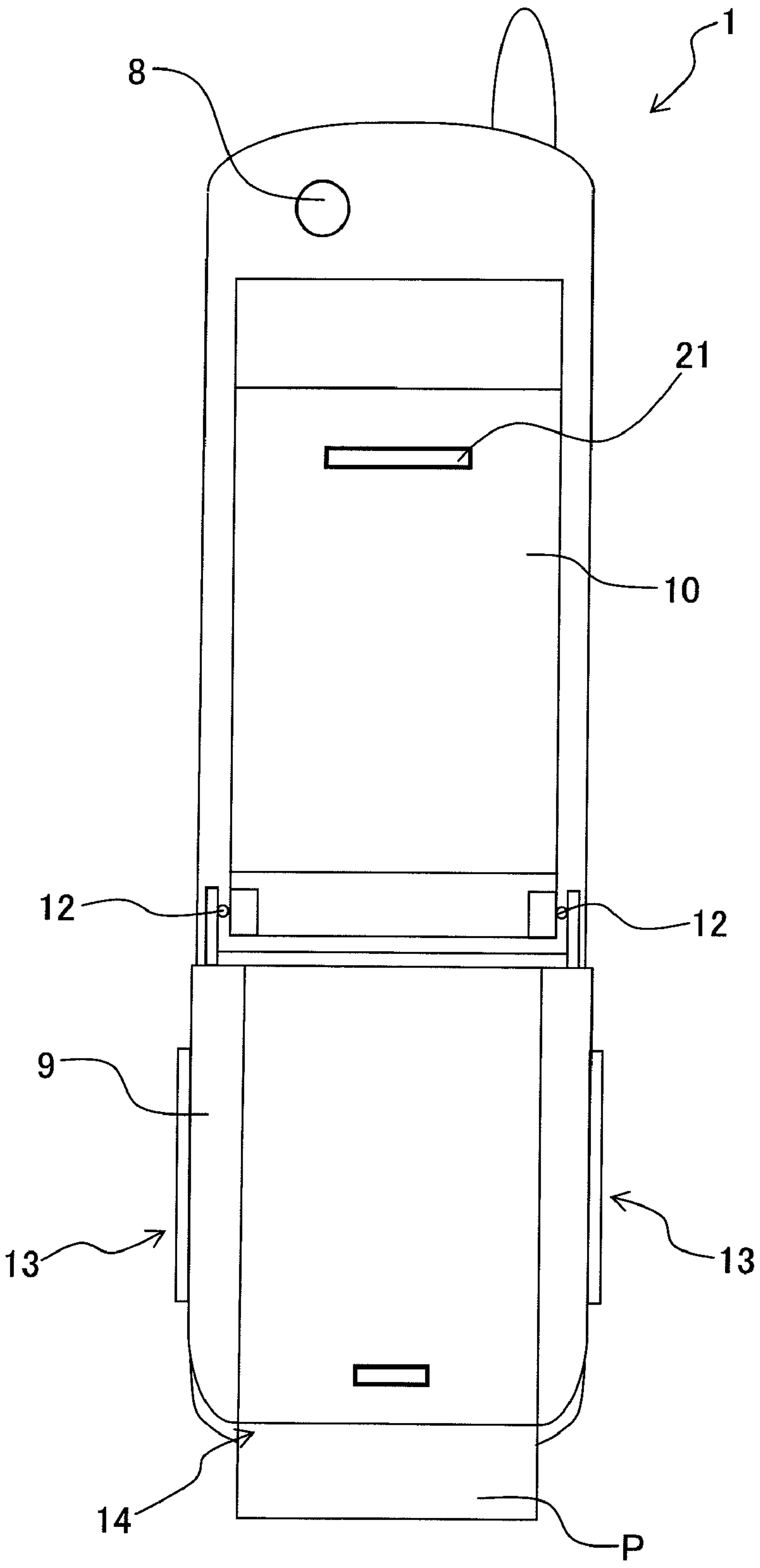
FIG. 2 shows a schematic bottom view illustrating the handy printer 1 according to the embodiment of the present invention.
Figure 3:
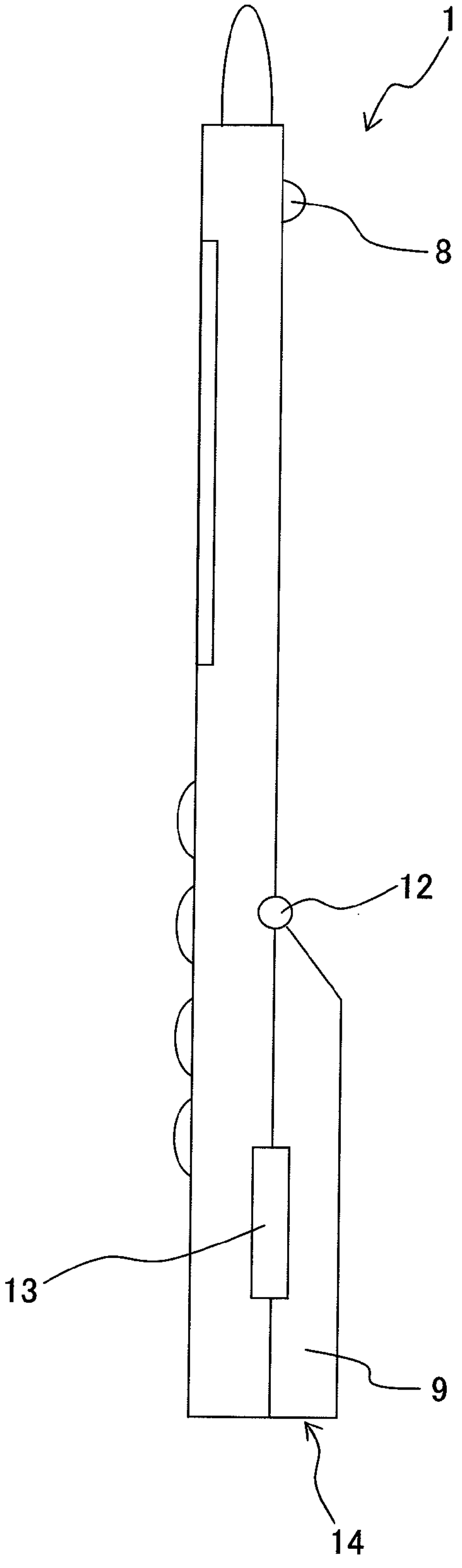
FIG. 3 shows a schematic side view illustrating the handy printer 1 according to the embodiment of the present invention.

FIGS. 2 and 3 show a schematic bottom view and a side view illustrating the handy printer 1 respectively. A camera 8, a cover member 9, and a recess 10 which is recessed from the surface of the handy-printer body casing 2 are provided on the lower surface of the handy printer 1.

As shown in FIGS. 2 and 3, the cover member 9 is provided with a shaft 12 which is rotatably supported by a bearing provided for the handy-printer body casing 2, and a pair of hook sections 13 which are arranged on side surfaces of the cover member 9.

Figure 7:
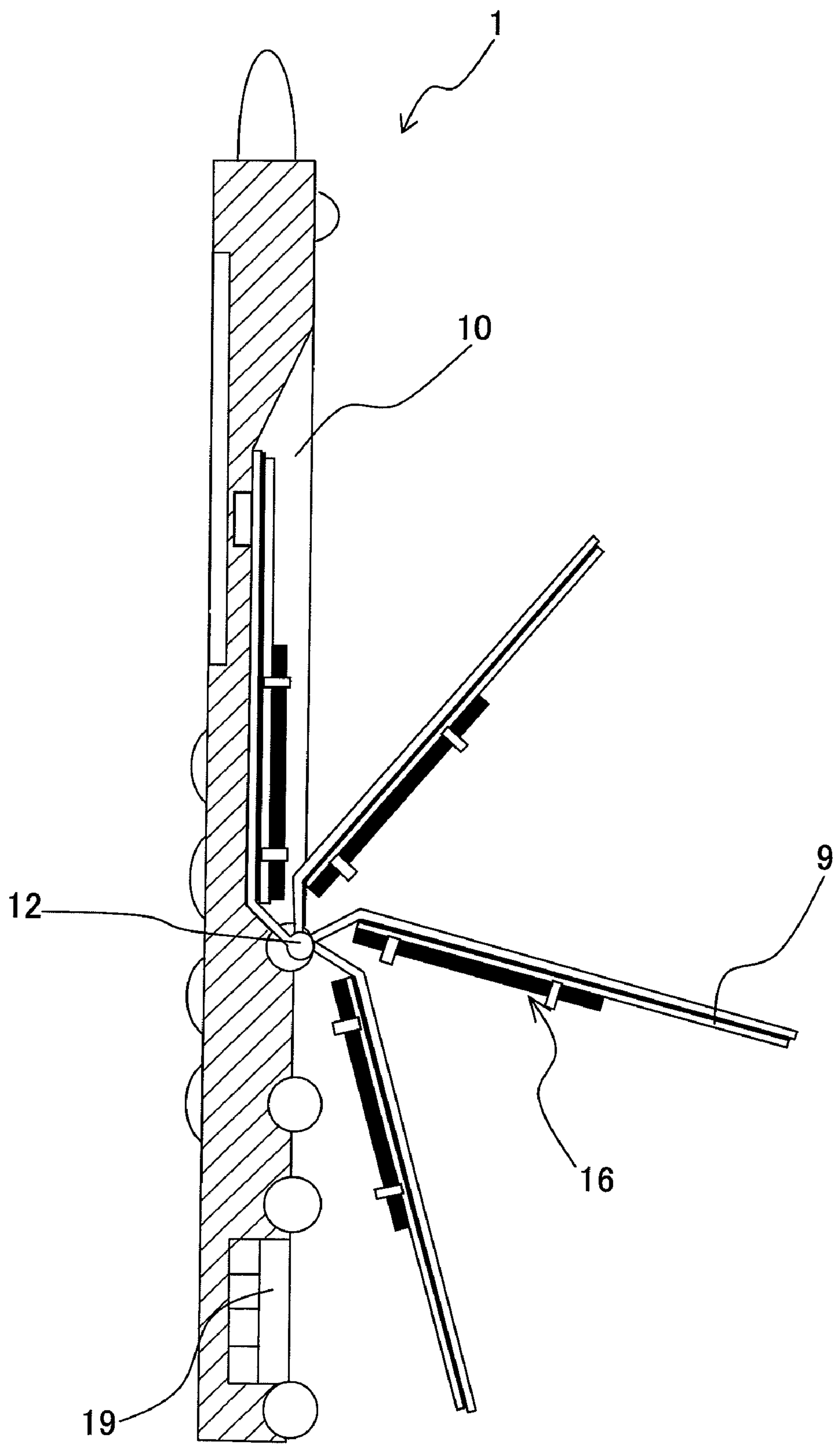
FIG. 7 shows an opening/closing operation for the cover member 9 of the handy printer 1.

The cover member 9 is provided rotatably on the handy-printer body casing 2. FIG. 7 shows the opening/closing operation of the cover member 9 of the handy printer 1. As shown in FIG. 7, the cover member 9 can be accommodated in the recess 10 by rotating the cover member 9 about the center of the shaft 12 after releasing the cover member 9 from the engagement by means of the hook sections 13. Accordingly, the cover member 9 can be switched between the closed state and the open state.

The position, at which the hook sections 13 of the cover member 9 are engaged with receiving sections so that the cover member 9 is in the closed state, corresponds to the "cover position at which the cover member covers the ink discharge surface" according to the present invention. On the other hand, the position, at which the cover member 9 is accommodated and held in the recess 10 so that the cover member 9 is in the open state, corresponds to the "exposure position at which the cover member does not cover the ink discharge surface" according to the present invention. Therefore, FIGS. 2 and 3 are the schematic bottom view and the side view illustrating the handy printer 1 wherein the cover member 9 is in the closed state, i.e., at the "cover position at which the cover member covers the ink discharge surface".

A cover sensor 21, which makes contact with the cover member 9 when the cover member 9 is accommodated, is provided in the recess 10. The pair of hook sections 13 are provided on the side surfaces of the cover member 9, and they are engageable with the receiving sections (not shown) provided for the handy-printer body casing 2 respectively. When the hook sections 13 and the receiving sections are engaged with each other, the cover member 9 is held and fixed at the position shown in FIG. 3. The handy-printer body casing 2 is provided with a hook sensor (not shown) in order to detect that the cover member 9 is in the closed state when the cover member 9 is held and fixed as shown in FIG. 3 in the closed state as described above. Accordingly, it is possible to detect that the hook sections 13 are engaged with the receiving sections. The hook sections 13 can be released from the engagement by the user by one hand.

Figure 4:
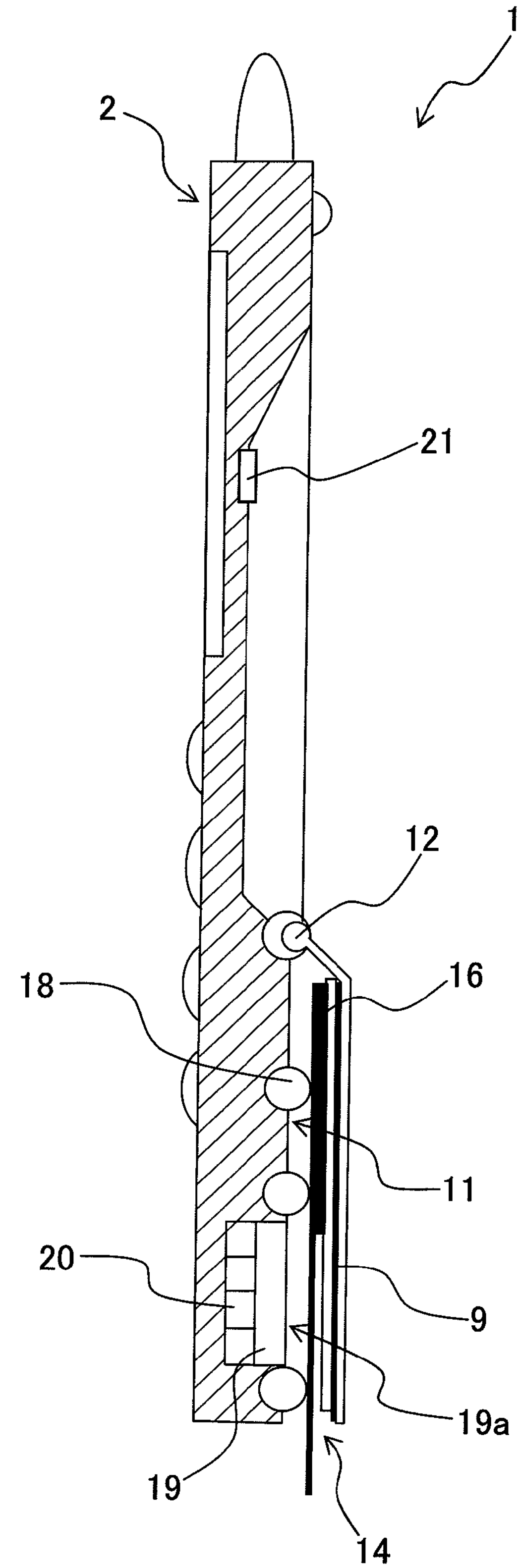
FIG. 4 shows a sectional view illustrating the handy printer 1 according to the embodiment of the present invention.

FIG. 4 shows a sectional view illustrating the handy printer 1 in which the cover member 9 is in the closed state. As shown in FIG. 4, when the cover member 9 is in the closed state (at the cover position), a part of the handy-printer body casing is hidden by the cover member 9. The surface 11, which is hidden, corresponds to the "concealable surface (hidden surface)" of the present invention. A recording paper-accommodating mechanism 16, which is capable of accommodating a plurality of small-sized recording paper sheets P in a stacked state, is provided on the back surface of the cover member 9 (surface opposed to the concealable surface 11 in the closed state).

As shown in FIG. 4, the cover member 9 has the shaft 12 disposed at one end. The other end forms a discharge port 14 together with the end of the handy-printer body casing 2. The recording paper-accommodating mechanism 16 is arranged at a position deviated toward the shaft 12 of the cover member 9. The concealable surface 11 of the handy-printer body casing 2 is provided with a plurality of recording paper-contact rollers (recording paper abutment rollers) 18 and an ink discharge head 19. The plurality of recording paper-contact rollers 18 abut against the recording paper sheet P accommodated in the recording paper-accommodating mechanism 16 to transport the recording paper sheet P to the discharge port 14. The ink discharge head 19 has nozzles which are capable of discharging ink liquid droplets to the recording paper sheet P. The ink discharge head 9 is arranged at a position deviated toward the discharge port 14 of the handy-printer body casing 2. Inks are supplied thereto from cartridges 20 contained in the handy-printer body casing 2. When the cartridges 20 are supplemented with the inks, the inks are injected from external ink tanks (not shown) via supply ports (not shown) disposed on the outer side of the handy-printer body casing 2.

The plurality of recording paper-contact rollers 18 are provided for the concealable surface 11 so that the plurality of recording paper-contact rollers 18 protrude from a level of the ink discharge surface 19*a* on which the nozzles of the ink discharge head 19 are formed. The plurality of recording paper-contact rollers 18 are arranged closely to the back surface of the cover member 9. The recording paper-contact rollers 18 are also arranged in an area opposed to the recording paper-accommodating mechanism 16 of the cover member 9. Further, the recording paper-contact rollers 18 are also arranged in the vicinity of the discharge port 14 of the handy-printer body casing 2 with the ink discharge head 19 intervening therebetween. Accordingly, the recording paper sheet P, which is accommodated in the recording paper-accommodating mechanism 16, can be transported to the position opposed to the ink discharge head 19.

Figure 5:
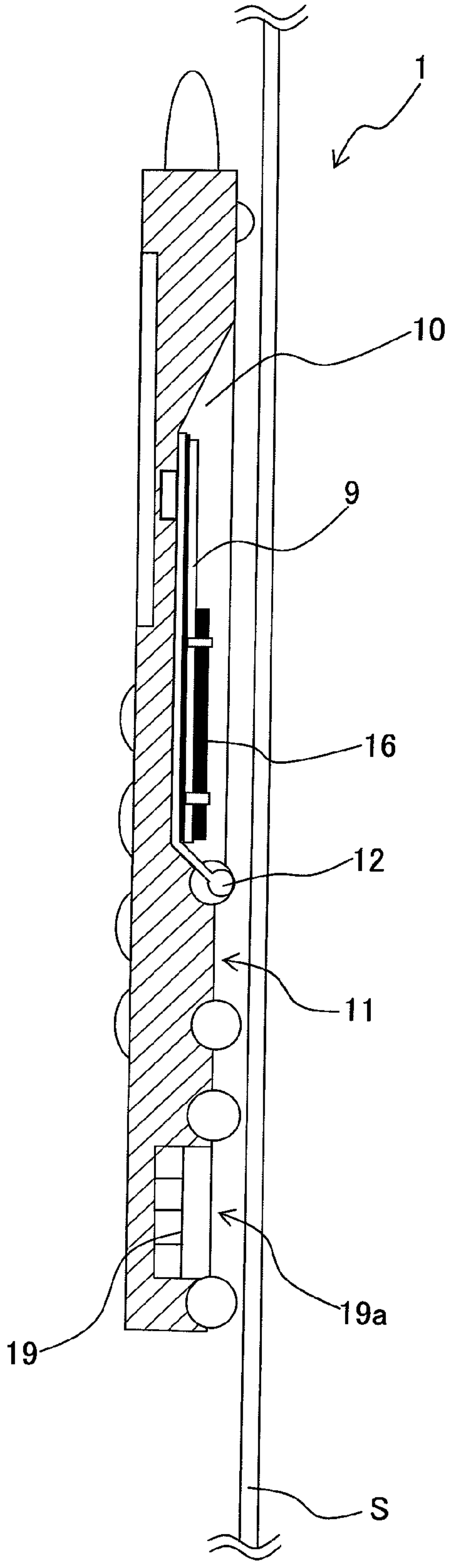
FIG. 5 shows a sectional view illustrating a state in which a cover member 9 of the handy printer 1 is open.
Figure 6:
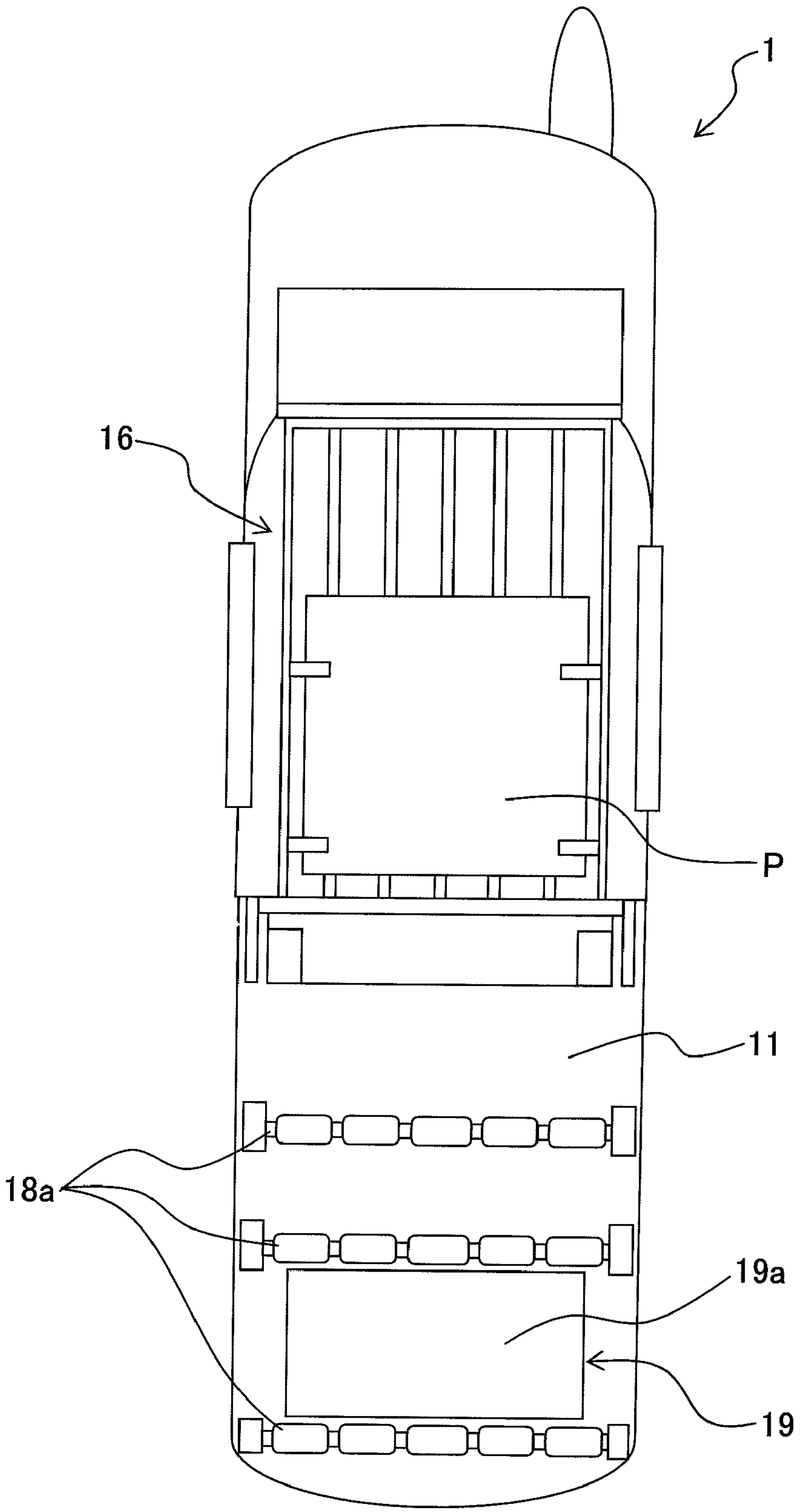
FIG. 6 shows a schematic top view illustrating the state in which the cover member 9 of the handy printer 1 is open.

FIGS. 5 and 6 show a sectional view and a schematic top view illustrating the handy printer 1 in the state in which the cover member 9 is open respectively. As shown in FIGS. 5 and 6, the recess 10 is positioned on the side opposite to the concealable surface 11 with the rotary support point (shaft 12) of the cover member 9 intervening therebetween. The cover member 9 can be accommodated in the recess 10 by being rotated about the center of the shaft 12. In such a situation, the cover member 9 is in the open state, and the ink discharge surface 19*a* is exposed to the outside. Accordingly, the inks can be discharged to various printing media including, for example, a recording paper sheet S having a size larger than that of the recording paper sheet P, wherein the recording paper sheet S cannot be accommodated in the recording paper-accommodating mechanism 16. As shown in FIG. 5, when the printing of this type is performed, the printing is performed while allowing all of the three types of the recording paper-contact rollers 18 to abut against the recording paper sheet S as the printing medium. When the printing is performed while allowing the plurality of recording paper-contact rollers 18 to abut, it is possible to provide a constant gap distance between the recording paper sheet S and the ink discharge head 19.

With reference to FIG. 5, the plane, which includes all of the abutting portions at which the recording paper-contact rollers 18 abut against the recording paper sheet S when the printing is performed on the recording paper sheet S and which also includes the printing surface of the recording paper sheet S, corresponds to the "virtual plane" of the present invention. The recess 10 of the handy-printer body casing 2 has a depth of such an extent that the cover member 9, the recording paper-accommodating mechanism 16 provided for the cover member 9, and the recording paper sheets P accommodated in the recording paper-accommodating mechanism can be positioned on the side of the handy-printer body casing 2 as compared with the virtual plane. In other words, the recess 10 has a depth of such an extent that the cover member 9 positioned at the exposure position, the recording paper-accommodating mechanism 16, and the plurality of sheets of the recording paper P are accommodated in the recess 10 and do not protrude from the handy-printer body and do not to contact with the virtual plane including a surface of the recording paper sheet S which is brought into contact with the recording paper-contact rollers 18. Accordingly, it is possible to provide such a positional relationship that the recording paper-accommodating mechanism 16 and the recording paper sheet P do not make any contact with the recording paper sheet S in the state in which the cover member 9 is accommodated in the recess 10. Therefore, it is possible to avoid any obstruction of the printing which would be otherwise caused such that the recording paper-accommodating mechanism 16 and the recording paper sheet P make contact with the recording paper sheet S when the printing is performed, for example, on the external printing medium.

Figure 8:
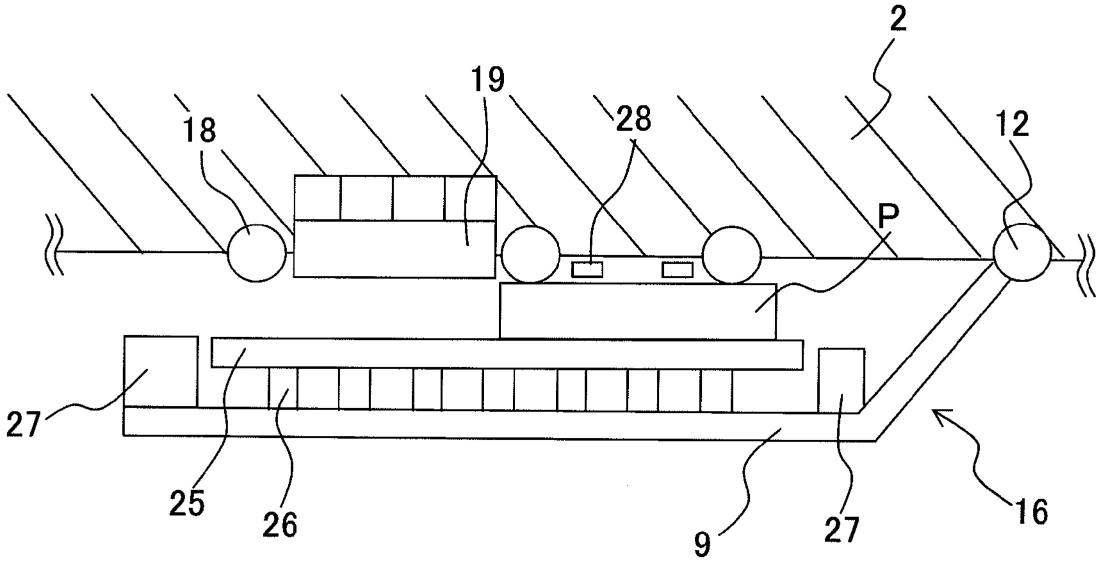
FIG. 8 shows a sectional view illustrating a recording paper-accommodating mechanism 16.
Figure 9:
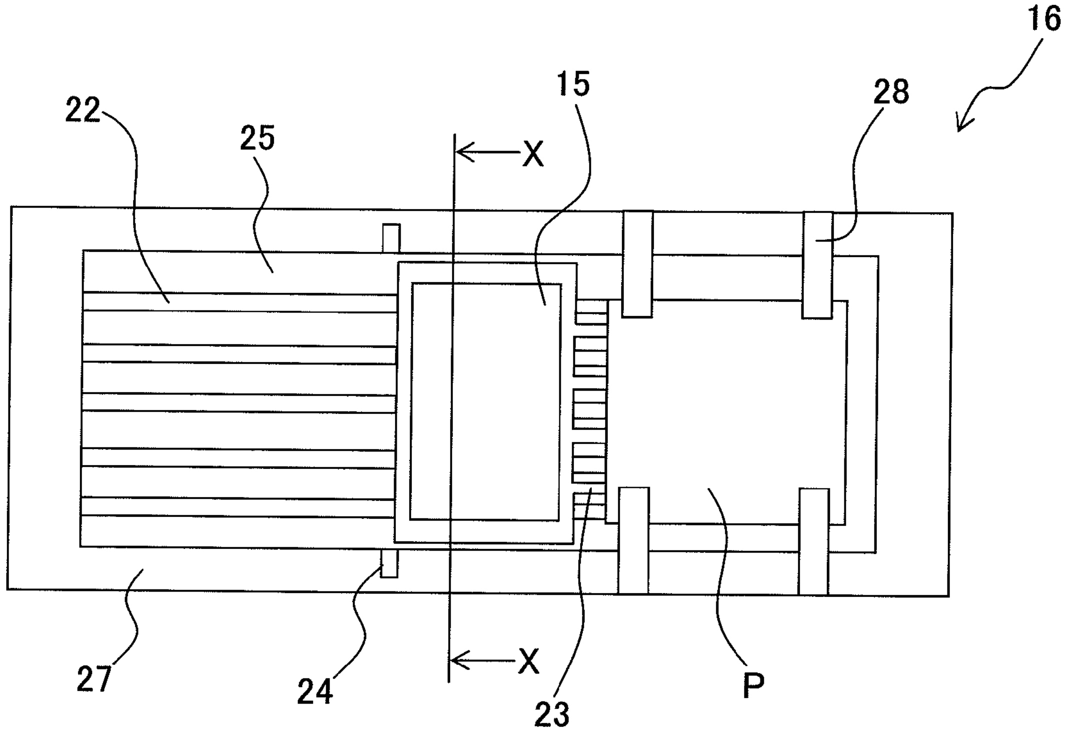
FIG. 9 shows a top view illustrating the recording paper-accommodating mechanism 16.

The recording paper-accommodating mechanism 16 will now be explained in detail. FIG. 8 shows a magnified view illustrating those disposed in the vicinity of the recording paper-accommodating mechanism 16 in the cross section (FIG. 4) of the handy printer 1 in the state in which the cover member 9 is closed. FIG. 9 shows a view in which the cover member 9 is viewed from the side of the recording paper-accommodating mechanism 16, i.e. a top view illustrating the recording paper-accommodating mechanism 16. The recording paper-accommodating mechanism 16 has a movable tray 25 which carries the recording paper sheets P, coil springs 26 which urge the movable tray 25 so that the movable tray 25 is separated from the cover member 9, a fixed tray 27 which is arranged around the movable tray 25, and recording paper-holding sections 28 which are provided upstandingly from the fixed tray 27 and which hold the recording paper sheet P.

The movable tray 25 is provided with platens 22 which extend toward the side of the handy-printer body casing 2. As shown in FIG. 8, when the cover member 9 is engaged with the handy-printer body casing 2 by means of the hook sections 13, i.e., when the cover member 9 is in the closed state, then the movable tray 25 is always urged by the coil springs 26. Therefore, the recording paper sheet P, which is disposed at the uppermost position, is always pressed by the recording paper-contact rollers 18. In this situation, the recording paper-holding section 28 holds the recording paper sheet P on the side of the handy-printer body casing 2 as compared with the position at which the recording paper-contact rollers 18 abut against the recording paper sheet P. Therefore, the recording paper sheet P is not prevented from being pressed toward the recording paper-contact rollers 18. Accordingly, even when the number of the recording paper sheets P is decreased, the recording paper sheets P can be always pressed toward the recording paper-contact rollers 18 by means of the coil springs 26. Therefore, the rotary force of the recording paper-contact rollers 18 can be always transmitted to the recording paper sheet P. Therefore, even when the number of the recording paper sheets P is decreased, it is possible to reliably transport the recording paper sheet P.

Further, as shown in FIG. 9, a cap member 15, which is composed of a distinct member, can be installed to the recording paper-accommodating mechanism 16. In the state in which the cover member 9 is closed, the cap member 15 composed of the distinct member makes contact with the ink discharge surface 19*a* of the ink discharge head 19 to seal it. For example, when the printing function is not used for a long term, the cap member 15 is installed by the user. When the ink discharge surface 19*a* is sealed with the cap member 15, then it is possible to protect the ink head, and it is possible to avoid the drying so that the head clog-up can be avoided.

Figure 10:
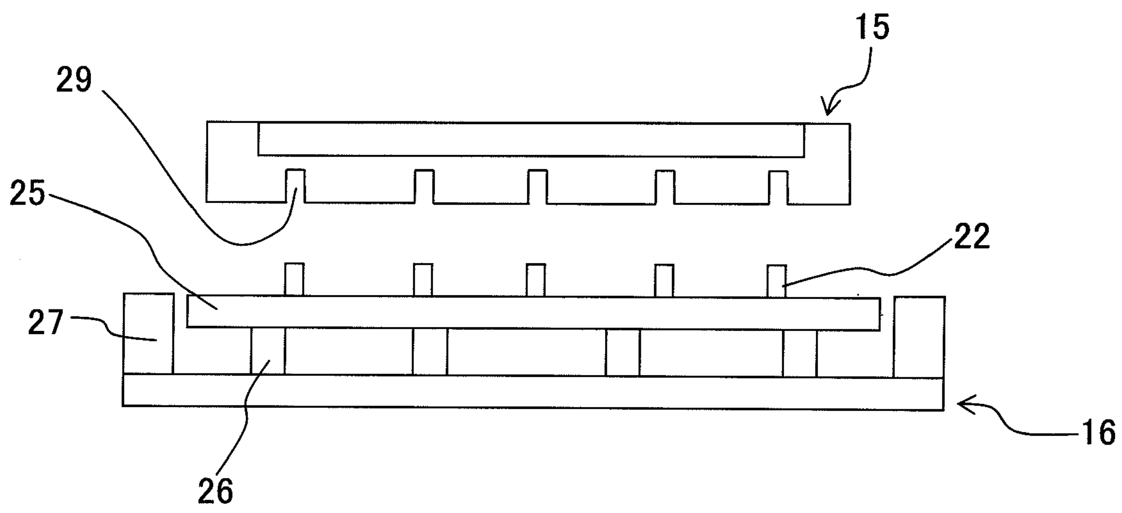
FIG. 10 shows a sectional view taken along a line X-X shown in FIG. 9 illustrating the recording paper-accommodating mechanism 16 and a cap member 15 composed of a distinct member.

FIG. 10 shows a sectional view taken along a line X-X shown in FIG. 9 illustrating the recording paper-accommodating mechanism 16 and the cap member 15 composed of the distinct member. As shown in FIGS. 9 and 10, the cap member 15 is provided with a recording paper stopper section 23 and grooves 29. The recording paper stopper section 23 abuts against the recording paper sheets P when the cap member 15 is installed at the predetermined position of the recording paper-accommodating mechanism 16. When the cap member 15 is installed to the recording paper-accommodating mechanism 16, the grooves 29 and the platens 22 are fitted to one another to play a role of a stopper so that the cap member 15 does not slide along the platens 22. Markings 24, which indicate the cap position for positioning the cap member 15, are affixed to the fixed tray 27. The user installs the cap member 15 to the platens 22 in conformity with the markings 24.

The cap member 15 is attached and detached in the state in which the cover member 19 is open. The thickness of the cap member 15 is larger than the distance between the ink discharge surface 19*a* and the platen 22. When the ink discharge surface 19*a* is sealed with the cap member 15, then the cap member 15 is installed to the platen 22, and the cover member 9 is closed. In this situation, the cap member 15 abuts against the ink discharge surface 19*a* before providing the state in which the cover member 9 is completely closed. Further, when the cover member 9 is completely closed, the cap member 15 functions so that the cap member 15 pushes the movable tray 25 toward the cover member 9. Accordingly, the coil springs 26 are compressed or shrunk. The compressed coil springs 26 allow the restoring force to act toward the ink discharge surface 19*a*. Owing to the restoring force, the cap member 15 can be pressed against the ink discharge surface 19*a*. Accordingly, the cap member 15 can seal the ink discharge surface 19*a*.

Next, an explanation will be made about the switching of the driving of the recording paper-contact rollers 18 between the case in which the printing is performed on the recording paper sheet P and the case in which the printing is performed on the recording paper sheet S.

Figure 11:
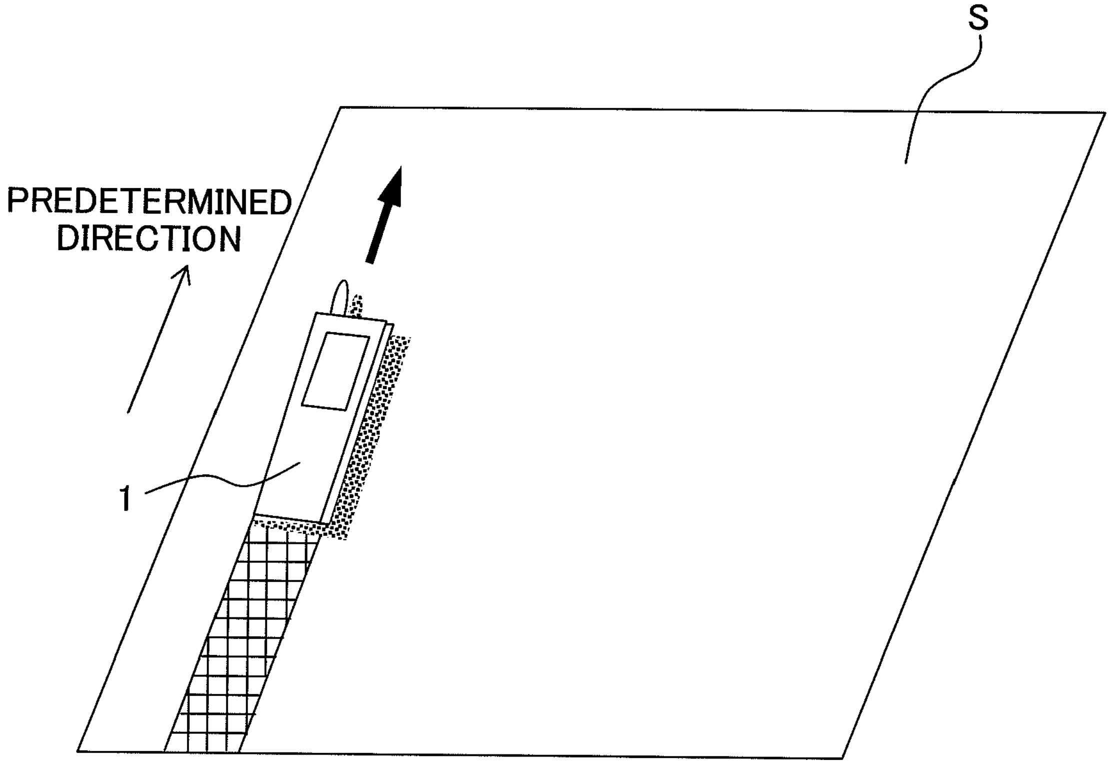
FIG. 11 shows a schematic perspective view illustrating a situation in which the printing is performed on a recording paper sheet S by using recording paper-contact rollers 18.

When the printing is performed on the recording paper sheet P, as shown in FIG. 4, the recording paper-contact rollers 18 are subjected to the driving rotation so that the recording paper sheet P is transported toward the discharge port 14. On the other hand, the situation, in which the printing is performed on the recording paper sheet S, is shown in FIG. 11. The printing is performed while moving the handy printer 1 in the predetermined direction by the user. Therefore, it is desirable that the recording paper-contact rollers 18 are subjected to the driven rotation in accordance with the movement by the user. The handy printer 1 of this embodiment makes it possible to perform the printing not only on the large-sized recording paper sheet S but also on various media including, for example, surfaces of resin containers and human hands.

Figure 12:
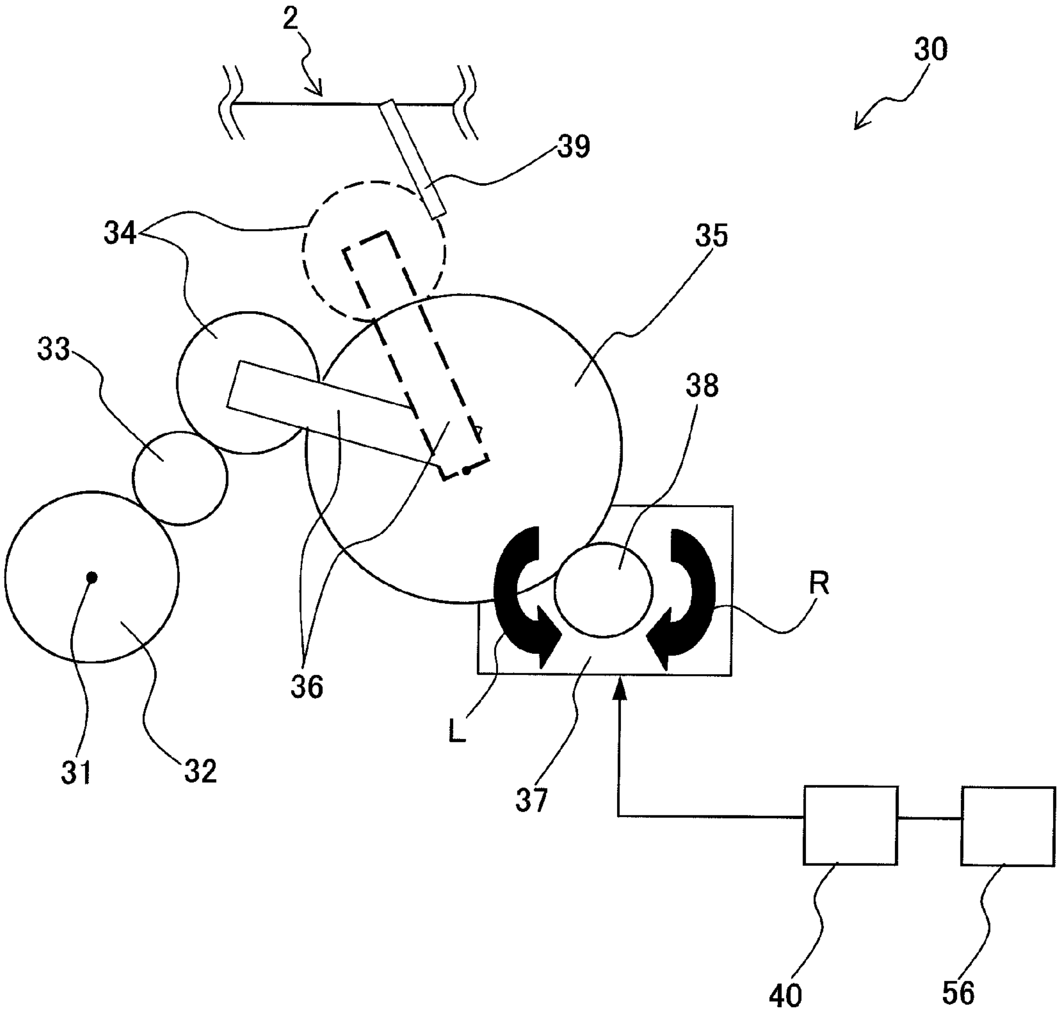
FIG. 12 shows a sectional view illustrating a recording paper transport mechanism 30.

Therefore, the recording paper-contact rollers 18 of this embodiment are connected to a recording paper transport mechanism 30 which is capable of switching the driving rotation effected by a motor and the driven or following rotation. FIG. 12 shows the recording paper transport mechanism 30.

As shown in FIG. 12, the recording paper transport mechanism 30 comprises a gear 32 which is connected coaxially with the recording paper-contact rollers 18 by means of a shaft 31, a gear 33 which is arranged at a position to be meshed with the gear 32, a planet gear 34 which is movable between a transmission position to be meshed with the gear 33 and a disconnected position not to be meshed therewith, and a sun gear 35 which rotates and moves the planet gear 34 to the transmission position and the disconnected position. The recording paper transport mechanism 30 further comprises a transport motor 37 which applies the rotational driving force to the recording paper-contact rollers 18, and a motor gear 38 which is installed to the rotary shaft of the transport motor 37. The transport motor 37 is connected to the control unit (controller) 40. The control unit 40 is connected to a first and second positions-detecting mechanism 56 for detecting the position of the cover member 9. The first and second positions-detecting mechanism 56 detects whether the cover member 9 is in the open state (at the first position) or in the closed state (at the second position). In this embodiment, the first position detection and the second position detection are performed by the common first and second positions-detecting mechanism 56. However, the first position and the second position may be detected by different detecting mechanisms respectively.

The sun gear 35 is connected to the planet gear 34 by the aid of an arm 36. The arm 36 is rotatably connected to the center shaft of the sun gear 35 and the center shaft of the planet gear 34. The sun gear 35 is arranged to be meshed with the motor gear 38. When a signal, which indicates that the cover member 9 is in the closed state (at the second position), is sent from the first and second positions-detecting mechanism 56, the control unit 40 rotates the transport motor 37 in the L direction as shown in the drawing. Accordingly, the planet gear 34 is moved so that the planet gear 34 approaches the gear 33, and the planet gear 34 is meshed with the gear 33 (position shown by solid lines in FIG. 12). Therefore, the rotational force of the transport motor 37 can be transmitted to the recording paper-contact rollers 18. When a signal, which indicates that the cover member 9 is in the open state (at the first position), is sent from the first and second positions-detecting mechanism 56, the transport motor 37 is rotated in the R direction. Accordingly, the planet gear 34 is moved so that the planet gear 34 is separated from the gear 33, and the planet gear 34 abuts against an arm stopper 39 provided in the handy-printer body casing 2 (position shown by broken lines in FIG. 12). Therefore, when the printing is performed on the recording paper S, the recording paper-contact rollers 18 can be allowed to act as driven rollers. In this way, the control unit 40 allows the planet gear 34 and the gear 33 to be meshed with each other and separated from each other by controlling the direction of rotation of the transport motor 37. Accordingly, it is possible to switch the recording paper-contact rollers 18 between the driving rotation effected by the motor and the driven rotation. Therefore, the recording paper-contact rollers 18 can perform the operation as the transport rollers for transporting the recording paper sheet P and the operation as the driven rollers to be used when the user performs the scanning by hand. When the recording is performed on the recording paper sheet S (the recording medium which is disposed at the outside of the casing), the plurality of recording paper-contact rollers 18 can be used as the guide rollers which guide the ink discharge head 19 while maintaining a spacing distance with respect to the recording paper sheet S (the recording medium). Therefore, it is possible to perform the correct recording.

The gears 32 and 33, the planet gear 34, the sun gear 35, and the motor gear 38, which are in the state of the planet gear 34 meshed with the gear 33, correspond to the "transport mechanism" of the present invention for transmitting the driving force of the motor to the plurality of recording paper-contact rollers. The planet gear 34, the sun gear 35, and the arm 36, which act to provide the state of the planet gear 34 separated from the gear 33, correspond to the "disconnecting mechanism" of the present invention for disconnecting the transmission of the driving force of the motor.

Figure 13:
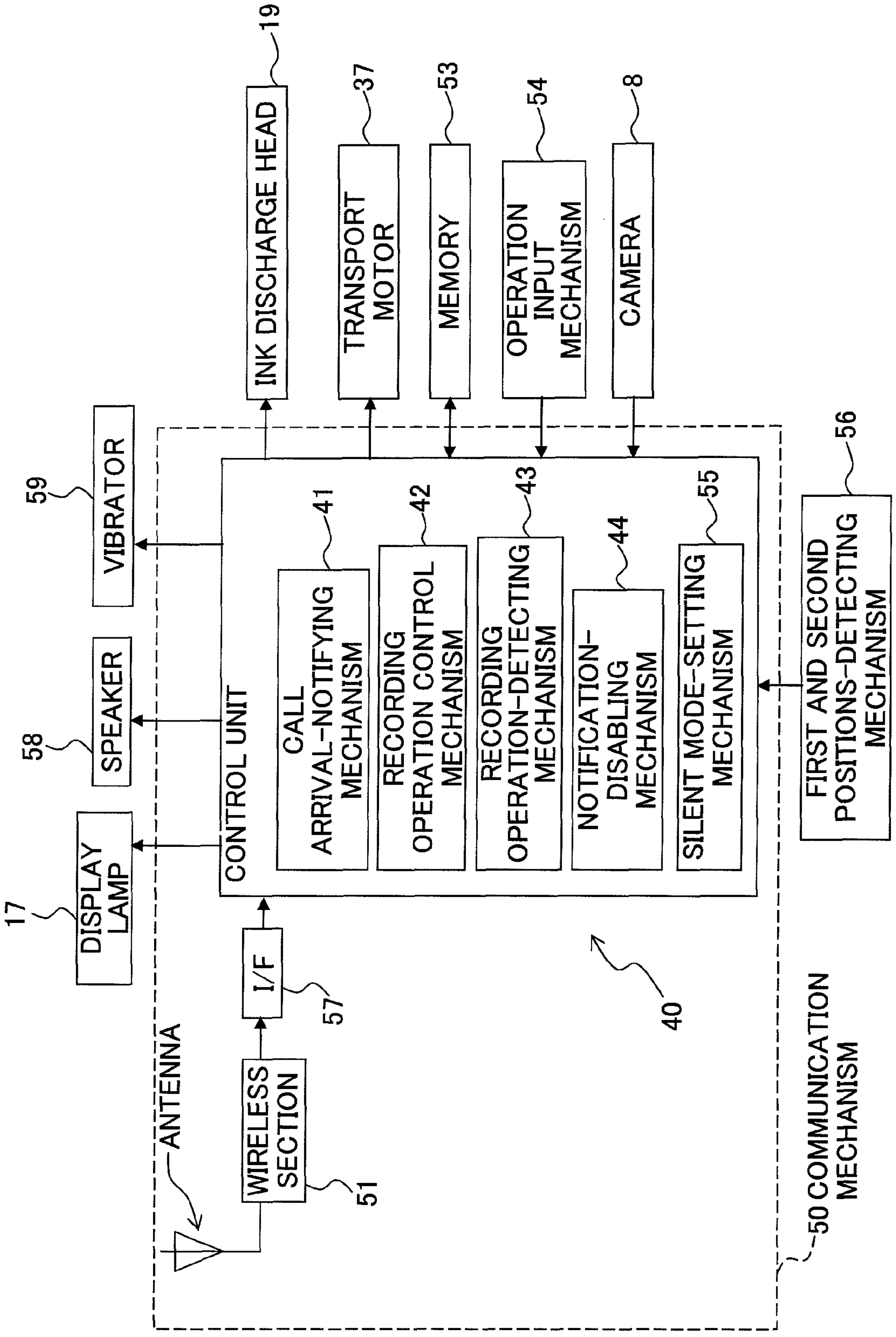
FIG. 13 shows a block diagram illustrating an electric configuration of the handy printer 1.

Next, an explanation will be made with reference to a block diagram shown in FIG. 13 about the electric configuration of the handy printer 1. As shown in FIG. 13, the communication mechanism 50 of the handy printer 1 comprises the control unit 40, a wireless section 51 which receives the radio wave from the mobile phone base station by the aid of the antenna, and an interface substrate 57 which converts the signal transmitted from the wireless section 51 so that the signal is inputted into the control unit 40. Further, the control unit 40 (controller) includes a call arrival-notifying mechanism (a call or signal arrival-notifying mechanism) 41 which notifies the user of the arrival of any incoming telephone call, any text message, or any signal, a recording operation control mechanism 42 which drives the ink discharge head 19 and the transport motor 37, and a recording operation-detecting mechanism 43 which detects the printing on the recording paper sheet.

The call arrival-notifying mechanism 41 performs the operation of at least one of the emission of the voice from the speaker 58 and the vibration of the vibrator 59 and the flashing of the display lamp 17, or only the flashing of the display lamp 17. When any call, any message, or any signal arrives, the call arrival-notifying mechanism 41 performs the call arrival-notifying operation to notify the user of the arrival. The method for the notification is set by performing the input by the user by means of an operation input mechanism 54. The control unit 40 also includes a silent mode-setting mechanism 55 (setting mechanism) so that the silent mode can be also set not to operate all of the speaker 58, the vibrator 59, and the display lamp 17.

The recording operation control mechanism 42 reads, from a memory 53, the data of any text or any image designated by the user when the user operates the operation input mechanism 54 to instruct the printing. The data is converted into the driving signal for driving the ink discharge head 19 and the driving signal is transferred to a driver (not shown) of the ink discharge head 19.

The recording operation-detecting mechanism 43 recognizes and detects that the driving signal is transferred to the driver of the ink discharge head 19 by the recording operation control mechanism 42.

The control unit 40 further includes a notification-disabling mechanism 44 which stops the operation of the speaker 58, the vibrator 59, and the display lamp 17 when any call, any message, or any signal arrives.

The notification-disabling mechanism 44 makes the control so that the call arrival-notifying operation, which relates to the speaker 58, the vibrator 59, and the display lamp 17 for notifying the user of the arrival of any call, any message, or any signal, is not performed upon the arrival, even when the user sets the call arrival-notifying mechanism 41 to be in any mode other than the silent mode. In relation to the arrival of any call, any message, or any signal caused when the control is made by the notification-disabling mechanism 44, the arrival log or reception log is allowed to remain in the memory 54, and the arrival or reception is displayed on the display screen.

Further, the control unit 40 is connected to the first and second positions-detecting mechanism 56 which detects that the cover member 9 is positioned in the closed state (at the second position) and the cover member 9 is in the open state (at the first position). The first and second positions-detecting mechanism 56 recognizes the first and second positions by means of the cover sensor 21 provided for the handy-printer body casing 2 as shown in FIGS. 2 and 4 and/or the hook sensor (not shown) to detect that the hook sections 13 are engaged with the receiving sections.

Figure 14:
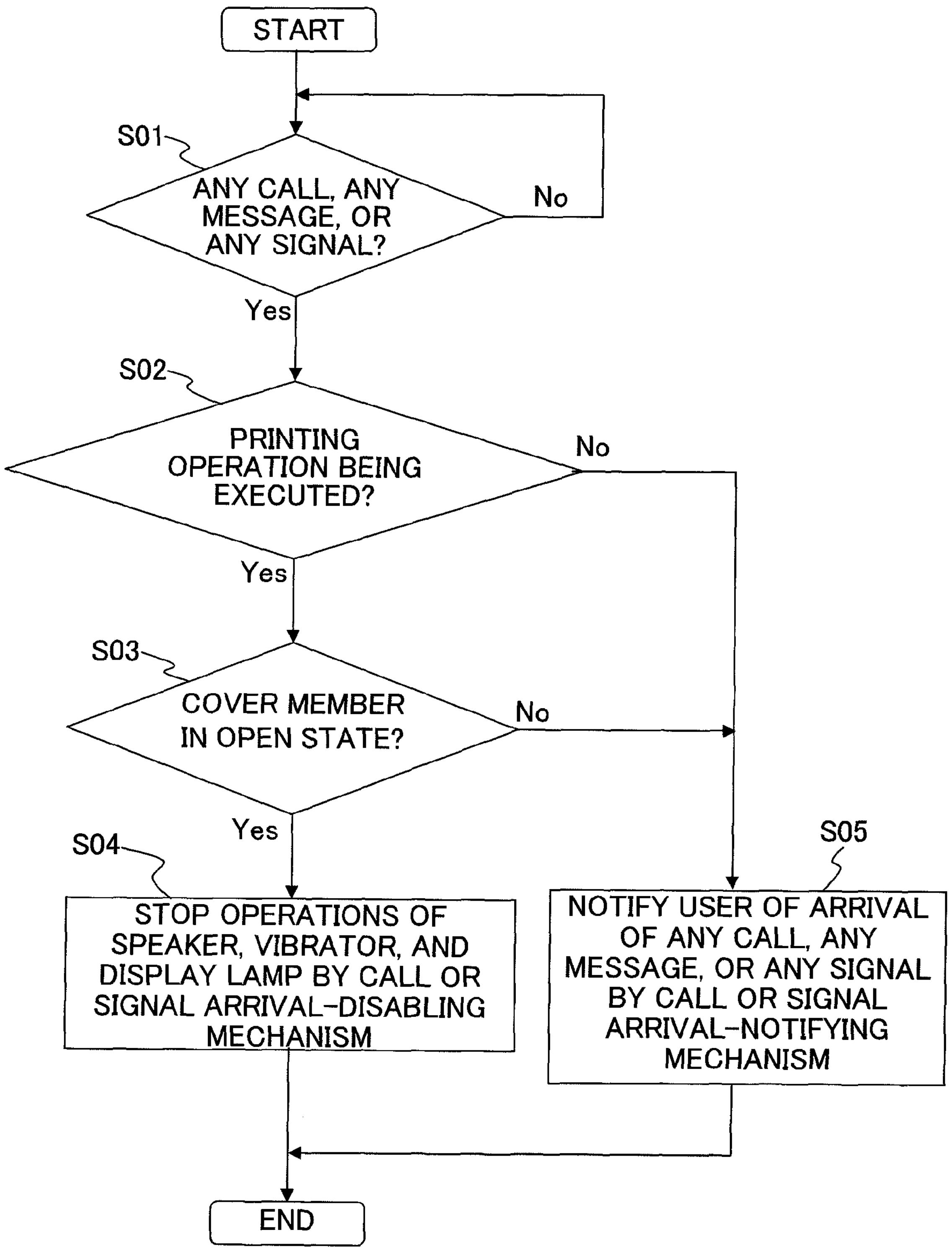
FIG. 14 shows a flow chart illustrating the control operation performed by a control unit 40.

Next, a series of control operations performed by the control unit 40 are shown in FIG. 14. At first, an explanation will be made about the control operation performed when an image is printed on the external recording paper sheet S by means of the handy printer 1. If the arrival of any call, any message, or any signal is confirmed (S01: Yes), the control unit 40 confirms whether or not the printing operation is executed, by means of the recording operation-detecting mechanism 43 (S02). If it is confirmed in this situation that the image data is transferred to the driver (S02: Yes), the position of the cover member 19 is subsequently confirmed by means of the first and second positions-detecting mechanism 56 (S03). If it is confirmed in Step S03 that the cover member 19 is in the open state (state of being positioned at the first position) (S03: Yes), the notification-disabling mechanism 44 is used to make the control so that all of the speaker 58, the vibrator 59, and the display lamp 17 are not operated irrelevant to the present setting (S04).

According to the control operation as described above, when the printing is performed on the recording paper sheet S by the handy printer 1, even if any call, any message, or any signal arrives to be received, then the user is not notified of the arrival. When the printing is performed on the recording paper sheet S, the user himself must determine the position of the handy printer 1 with respect to the recording paper sheet S. Therefore, if the user is informed of the arrival during the printing, it is feared that the user may be surprised at the sudden sound, light, or vibration, and the determined position may be deviated. It is also considered that the vibration caused by the vibrator or the like may directly move the handy printer 1 itself.

In particular, any problem may arise highly possibly when the present invention is applied to the mobile phone as in this embodiment and the arrival is the arrival of any telephone call, for the following reason. That is, in general, when the user receives the arrival of any telephone call, then the user promptly carry the handy printer (mobile phone) 1 to approach the ear in response thereto, or the user promptly picks up the handy printer (mobile phone) 1 in response thereto in order to confirm the information about the party on telephone displayed on the display screen 7. Therefore, it is feared that the handy printer may be separated from the recording paper sheet S even when the printing is being performed.

If the user moves the handy printer 1 so that the handy printer 1 is separated from the recording paper sheet S in response to the arrival of any call, then the printing operation is not only interrupted, but the inks, which are discharged from the ink discharge head 19 during the printing operation, are also landed on inappropriate positions to disturb the image to be printed. However, according to the control operation of the present invention as described above, even when any call arrives to be received, the user is not informed of the arrival. Therefore, it is possible to avoid the inconvenience as described above, and it is possible to reliably execute the printing on the recording paper sheet S.

When the handy printer 1 has the mechanism to enable the setting to the silent mode as in the handy printer 1 of this embodiment, even if the user does not select the silent mode, then the control unit 40 can make the control so that the arrival notification is disabled or invalidated by means of the call or signal arrival-disabling mechanism 44. Therefore, when the printing is performed on the recording paper sheet S, it is possible to execute the printing on the recording paper sheet S without any error without being disturbed by the arrival of any call, any message, or any signal.

Next, an explanation will be made with reference to FIG. 14 about a case in which the printing is performed on the recording paper sheet P by the handy printer 1. The components or parts, which are constructed in the same manner as those of the embodiment described above, are designated by the same reference numerals, any explanation of which will be appropriately omitted.

The control unit 40 confirms whether or not the printing operation is executed (S02) after confirming the arrival of any call, any message, or any signal (S01: Yes). As a result, if the execution of the printing operation is confirmed (S02: Yes), the position of the cover member 19 is confirmed (S03). If it is confirmed that the cover member 19 is in the closed state (at the second position) (S03: No), the arrival of any call, any message, or any signal is notified by means of the call arrival-notifying mechanism 41 (S05). If the printing operation is not executed upon the arrival of any call, any message, or any signal (S02: No), the arrival is notified.

As described above, when the printing is performed on the recording paper sheet P, i.e., when the printing operation is performed by the ink discharge head 19 in the state in which the cover member 9 is closed (positioned at the second position), then the arrival is not disabled or invalidated, and the user is informed of the arrival. In this way, when the printing is performed on the recording paper sheet P, the relative positional relationship is maintained between the ink discharge head 19 and the recording paper sheet P. Therefore, for example, when the arrival is the arrival of any telephone call, even if the telephone conversation is made during the printing, then the printing is not interrupted. Therefore, it is possible to simultaneously perform both of the printing operation and the telephone conversation.

Next, modified embodiments, in which various modifications are applied to the embodiment described above, will be explained. However, the components or parts, which are constructed in the same manner as those of the embodiment described above, are designated by the same reference numerals, any explanation of which will be appropriately omitted.

In the embodiment described above, the control unit 40 controls the call arrival-notifying mechanism 41 so that the arrival of any call, any message, or any signal is notified during the printing on the recording paper sheet P. However, the control may be made such that the notification of the arrival of any call, any message, or any signal is disabled by the notification-disabling mechanism 44 during the printing on the recording paper sheet P as well.

When any telephone call arrives to be received during the printing on the recording paper sheet P, and the telephone conversation is made while performing the printing, then the recording paper sheet P, which has been subjected to the printing, is discharged while allowing the handy printer 1 to approach the ear. In this situation, the following fear may arise. That is, the user is completely absorbed in the conversation, and the user is not aware of the timing at which the recording paper sheet P is discharged. The user cannot catch the discharged recording paper sheet P. The recording paper sheet P is discharged from the discharge port 14, and the recording paper sheet P falls to the floor as it is. The recording paper sheet P may be dirtied. Further, the handy printer 1 is allowed to approach the ear. Therefore, if the inks of the discharged recording paper sheet P are not sufficiently dried, the inks may be adhered to the face as well. Further, when the printing is performed during the telephone conversation, it is also feared that the receiving speaker sound may be hardly heard in some cases, and/or the conversation of the user may be hardly heard by the party on telephone in other cases, due to the driving sounds of the ink discharge head 19 and the transport motor 37. Therefore, when the control is made so that the notification of the arrival of any call, any message, or any signal call is disabled or invalidated during the printing on the recording paper sheet P as well, it is possible to solve the problem as described above.

Further, the example, in which the handy printer of the present invention is applied to the flip type mobile phone with the handy-printer body casing 2 having the straight shape, has been referred to and explained as the embodiment of the present invention. However, those to which the present invention is applicable are not limited the mobile phone as described above. For example, the present invention is also applicable, for example, to a folding type mobile phone as well as to a slide type mobile phone in which push-buttons and a display screen are provided on distinct casings and the respective casings are allowed to slide. In a case that the present application is applied to the folding type mobile phone, it is allowable to arrange the rotary support point of the cover member on the same axis with the folding hinge portion of the folding type mobile phone.

The handy printer of the present invention is applicable to various communication apparatuses or devices other than the mobile phone. Such communication apparatuses or devices include, for example, portable game machines, PND (Personal Navigation Device), and PDA (Personal Digital Assistant). The communication apparatuses or devices as described above perform the external communication, and they are capable of effecting the reception and the arrival of various types of electronic information including, for example, electronic mails, images, map information, position information, music, and game softwares. Therefore, the "arrival" or the "call arrival" referred to in the present invention means not only the arrival of any telephone call in the mobile phone but also the reception and the arrival of various types of electronic information as described above. Also in the case of the communication apparatuses or devices as described above, the operation for notifying the user of the arrival is performed upon the arrival by using, for example, the sound, the light, and/or the vibration. Even when the present invention is applied to the communication apparatuses or devices as described above, the control of the operation for notifying the arrival during the printing according to the present invention is effective.

Figure 15:
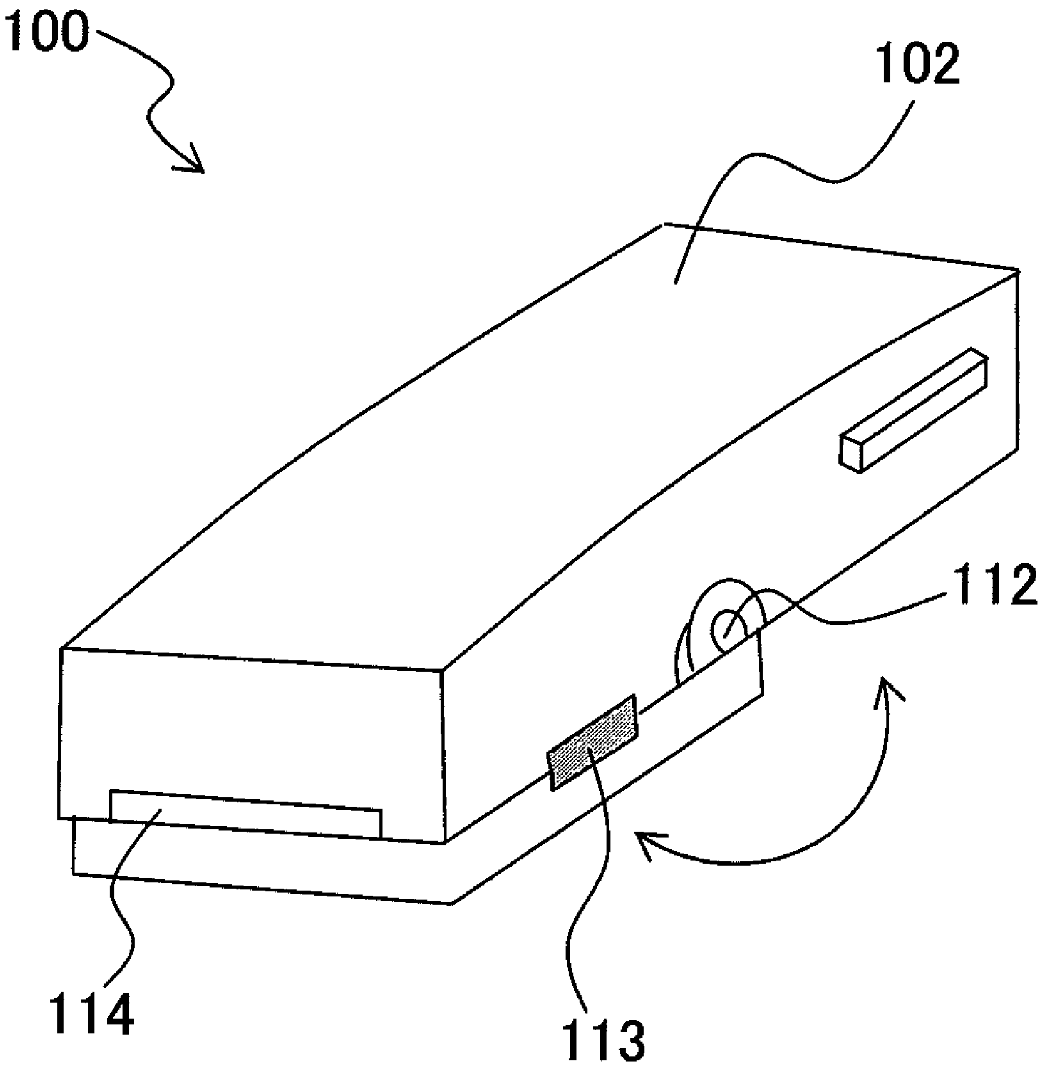
FIG. 15 shows a perspective view illustrating a handy printer 100 according to another embodiment of the present invention.

Further, the present invention is sufficiently established as a handy printer having no communication mechanism as well. FIG. 15 shows the handy printer 100 having no communication mechanism as an exemplary embodiment of the present invention. The handy printer 100 has, in a handy-printer body casing 102, an unillustrated recording paper-accommodating mechanism, an ink discharge head, and a recording paper transport mechanism. A cover member 109 is provided with a shaft 112 which is rotatably supported by a bearing provided for the handy-printer body casing 102, a pair of hook sections 113 which are arranged on side surfaces of the cover member 109, and a discharge port 114 which is open on one end side of the handy-printer body casing 102. The cover member 109 is provided rotatably on the handy-printer body casing 102. Therefore, when the cover member 109 is rotated about the center of the shaft 112 after releasing the cover member 109 from the engagement with the hook sections 113, the cover member 109 can be switched between the closed state (at the cover position, the second position) and the open state (at the exposure position, the first position).

Accordingly, when the cover member is positioned at the cover position, the recording can be performed on the recording paper sheet accommodated in the recording paper-accommodating mechanism. When the cover member is positioned at the exposure position, the recording can be performed on the recording medium disposed outside the apparatus. Therefore, the recording can be performed on recording media having various sizes without being limited to the recording paper sheet having a size capable of being accommodated in the recording paper-accommodating mechanism.

In the embodiment of the present invention, the cover member 9 is provided rotatably with respect to the handy-printer body casing 2. However, the cover member 9 may be constructed in any other arrangement provided that the cover member 9 is movable between the "exposure position" and the "cover position". For example, the following arrangement is available. That is, the cover member 9 is provided slidably with respect to the handy-printer body casing 2. The ink discharge surface 19*a* is exposed or hidden in accordance with the sliding movement.

In the embodiment of the present invention, the ink discharge head 19 and the recording paper transport mechanism 30 are provided on the side of the handy-printer body casing 2, and the recording paper-accommodating mechanism 16 is provided for the cover member 9. However, these components may be provided oppositely. That is, the recording paper-accommodating mechanism 16 may be provided on the side of the handy-printer body casing 2, and the ink discharge head 19 and the recording paper transport mechanism 30 may be provided for the cover member 9. Even in the case of this arrangement, the ink discharge head 19 can be also switched or changed over so that the ink discharge head 19 is exposed or hidden, in accordance with the movement of the cover member, and thus the effect of the present invention is obtained.

What is claimed is:

1. A handy printer which performs recording by discharging an ink to a recording paper and a recording medium, the handy printer comprising:

a recording paper-accommodating mechanism which accommodates the recording paper;

an ink discharge head having an ink discharge surface in which nozzles discharging the ink to the recording paper are formed;

a recording paper transport mechanism which transports the recording paper;

a cover member which is movable between a cover position at which the cover member covers the ink discharge surface and an exposure position at which the cover member does not cover the ink discharge surface;

a handy-printer body which holds the cover member to be movable between the cover position and the exposure position; and a controller which controls the ink discharge head such that the ink discharge head performs the recording on the recording paper when the cover member is positioned at the cover position, and that the ink discharge head performs the recording on the recording medium which is located at the outside of the handy printer when the cover member is positioned at the exposure position, wherein the recording paper transport mechanism includes a plurality of recording paper-contact rollers;

the cover member has a rotary support point provided on the handy-printer body;

the cover member is configured to rotatably pivot about the rotary support point;

the handy-printer body has a concealable surface which is concealed by the cover member when the cover member is positioned at the cover position, the ink discharge head and the recording paper-contact rollers being provided on the concealable surface;

the recording paper-accommodating mechanism is provided so that the recording paper-accommodating mechanism is capable of holding a plurality of sheets of the recording paper in a stacked state, on a surface of the cover member facing the concealable surface when the cover member is positioned at the cover position;

the recording paper-contact rollers protrude from the concealable surface beyond the ink discharge surface, and a part of the recording paper-contact rollers is brought into contact with the plurality of sheets of the recording paper in the stacked state held by the recording paper accommodating mechanism when the cover member is positioned at the cover position;

a recess which accommodates the cover member positioned at the exposure position is formed in the handy-printer body on a side opposite to the concealable surface with respect to the rotary support point; and the recess has a depth of such an extent that the cover member positioned at the exposure position, the recording paper-accommodating mechanism, and the plurality of sheets of the recording paper are accommodated in the recess and do not protrude from the handy-printer body and do not to contact with a virtual plane including a surface of the recording medium which is brought into contact with the recording paper-contact rollers.

2. The handy printer according to claim 1, wherein the recording paper transport mechanism further includes a motor, a transmission mechanism which transmits a driving force of the motor to the recording paper-contact rollers, and a disconnecting mechanism which disconnects the transmission of the driving force transmitted by the transmission mechanism; and the disconnecting mechanism disconnects the transmission of the driving force transmitted by the transmission mechanism when the cover member is positioned at the exposure position.

3. The handy printer according to claim 1, further comprising a cap member which seals the nozzles formed on the ink discharge surface.

4. The handy printer according to claim 1, further comprising a second position-detecting mechanism which detects whether or not the cover member is at the cover position;

wherein the notification-disabling mechanism permits the call arrival-notifying operation when the second position-detecting mechanism detects that the cover member is at the cover position and the recording operation detecting mechanism detects that the recording operation is being performed.

5. The handy printer according to claim 1, further comprising a second position-detecting mechanism which detects whether or not the cover member is at the cover position;

wherein the notification-disabling mechanism disables the call arrival-notifying operation also when the second position-detecting mechanism detects that the cover member is at the cover position and the recording operation detecting mechanism detects that the recording operation is being performed.

6. The handy printer according to claim 1, further comprising a setting mechanism which is capable of selectively setting, in accordance with an input operation by the user, a notification-enabled state in which the call arrival-notifying operation to be performed by the call arrival-notifying mechanism is permitted and a notification-disabled state in which the call arrival-notifying operation is disabled;

wherein the notification-disabling mechanism disables the call arrival-notifying operation even when the notification-enabled state is set by the setting mechanism.

7. A mobile phone comprising:

the handy printer as defined in claim 1;

a microphone;

a speaker; and push-buttons via which the user performs an input operation.

* * * * *